US009482548B2

(12) United States Patent
Grabar et al.

(10) Patent No.: US 9,482,548 B2
(45) Date of Patent: Nov. 1, 2016

(54) ROUTE INSPECTION PORTALS

(71) Applicant: Microsoft Corporation, Redmond, WA (US)

(72) Inventors: Yekaterina Grabar, Seattle, WA (US); Daniel Dole, Seattle, WA (US); Dvir Horovitz, Redmond, WA (US); Casey D. Stein, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/333,842

(22) Filed: Jul. 17, 2014

(65) Prior Publication Data
US 2016/0018238 A1    Jan. 21, 2016

(51) Int. Cl.
| | | |
|---|---|---|
| *G01C 21/36* | (2006.01) | |
| *G06F 17/30* | (2006.01) | |
| *G09B 29/00* | (2006.01) | |
| *G06F 9/44* | (2006.01) | |
| *G06Q 30/02* | (2012.01) | |

(52) U.S. Cl.
CPC ....... *G01C 21/3647* (2013.01); *G01C 21/3658* (2013.01); *G01C 21/3676* (2013.01); *G01C 21/3682* (2013.01); *G06F 9/4443* (2013.01); *G06F 17/30241* (2013.01); *G09B 29/007* (2013.01); *G06Q 30/0251* (2013.01); *G06Q 30/0259* (2013.01); *G06Q 30/0261* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,982,298 | A * | 11/1999 | Lappenbusch | G08G 1/0969 340/905 |
| 6,023,241 | A * | 2/2000 | Clapper | G01S 19/14 342/357.32 |
| 7,076,505 | B2 * | 7/2006 | Campbell | G01C 21/367 340/990 |
| 7,272,498 | B2 | 9/2007 | Singh | |

(Continued)

FOREIGN PATENT DOCUMENTS

| | | |
|---|---|---|
| EP | 2533229 A1 | 12/2012 |
| WO | 2012154365 A2 | 11/2012 |

OTHER PUBLICATIONS

Carmichael, Gail, "Street Level Mapping in Real Time", Published on: Feb. 16, 2008, pp. 6 Available at: http://compscigail.blogspot.in/2008/02/street-level-mapping-in-real-time.html.

(Continued)

*Primary Examiner* — Thomas Tarcza
*Assistant Examiner* — Edward J Pipala
(74) *Attorney, Agent, or Firm* — Steven Spellman; Tom Wong; Micky Minhas

(57) ABSTRACT

One or more techniques and/or systems are provided for populating a map interface with a route inspection portal and/or for generating travel route video. In an example, a map interface is populated with a map canvas illustrating a travel route. The map canvas is populated with inspection markers corresponding to imagery depicting travel route portions of the travel route. Responsive to identifying a selection of an inspection marker at an inspection location, imagery depicting the inspection location may be identified. The map canvas is populated with a route inspection portal for the inspection marker. The route inspection portal is populated with the imagery (e.g., street-side imagery of an intersection along the travel route). In an example, a travel route video, comprising video frames corresponding to an ordering of the imagery (e.g., from a start location to an end location) along the travel route, may be generated and/or played.

20 Claims, 12 Drawing Sheets

(56) References Cited

U.S. PATENT DOCUMENTS

| | | | |
|---|---|---|---|
| 7,548,814 B2 | 6/2009 | Pantalone et al. | |
| 7,606,663 B2 * | 10/2009 | Neef | G01C 21/362 455/456.1 |
| 8,019,536 B2 * | 9/2011 | McQuaide, Jr. | G01C 21/36 340/995.24 |
| 8,395,522 B2 * | 3/2013 | Kweon | B60K 35/00 340/438 |
| 8,447,136 B2 | 5/2013 | Ofek et al. | |
| 9,041,741 B2 * | 5/2015 | Mabbutt | G06T 19/006 345/156 |
| 9,063,582 B2 * | 6/2015 | Beaurepaire | G06F 3/03 |
| 2009/0182501 A1 | 7/2009 | Fyke et al. | |
| 2009/0240431 A1 | 9/2009 | Chau et al. | |
| 2010/0023254 A1 | 1/2010 | Machino | |
| 2010/0138796 A1 | 6/2010 | Abramson et al. | |
| 2011/0283223 A1 | 11/2011 | Vaittinen et al. | |
| 2012/0249797 A1 | 10/2012 | Haddick et al. | |
| 2012/0316782 A1 | 12/2012 | Sartipi et al. | |
| 2013/0162665 A1 | 6/2013 | Lynch | |
| 2013/0321461 A1 | 12/2013 | Filip | |
| 2013/0324164 A1 * | 12/2013 | Vulcano | H04W 4/02 455/457 |

OTHER PUBLICATIONS

"Streetside", Published on: Aug. 2, 2010, pp. 2 Available at: http://www.microsoft.com/maps/streetside.aspx.

Ho, Kelvin, "From Where You Are to Where You Want to Go", Published on: Nov. 6, 2013, pp. 14 Available at: http://google-latlong.blogspot.in/2013/11/from-where-you-are-to-where-you-want-to.html.

"International Search Report & Written Opinion Issued in PCT Application No. PCT/US2015/040236", Mailed Date: Oct. 16, 2015, 12 Pages.

\* cited by examiner

ROUTE INSPECTION PORTALS

BACKGROUND

Many applications and/or websites provide information through map interfaces. For example, a videogame may display a destination for an avatar on a map canvas; a running website may display running routes through a web map interface; a mobile map app may display driving directions on a road map canvas; a realtor app may display housing information, such as images, sale prices, home value estimates, and/or other information on a map canvas; etc. Such applications and/or websites may allow a user to pan and/or zoom to view different content.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for populating a map interface with a route inspection portal and/or for generating a travel route video are provided herein. In an example of populating a map interface with a route inspection view portal, a map interface may be populated with a map canvas illustrating a travel route. The map canvas may be populated with one or more inspection markers corresponding to imagery depicting travel route portions of the travel route. Responsive to identifying a selection of a first inspection marker at a first inspection location within the map canvas, a second inspection marker, at a second inspection location, may be identified as corresponding to first imagery depicting the first inspection location. The map canvas may be populated with a route inspection portal for the first inspection marker. The route inspection portal may be populated with the first imagery. In an example, a travel instruction for the first inspection location may be identified, and the route inspection portal may be populated with the travel instruction.

In an example of generating a travel route video, a map interface may be populated with a map canvas illustrating a travel route. A travel route video may be generated for the travel route. The travel route video may comprise a plurality of video frames corresponding to a sequential travel route ordering of imagery depicting travel route portions of the travel route. Responsive to receiving a play travel route video command, the travel route video may be played.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
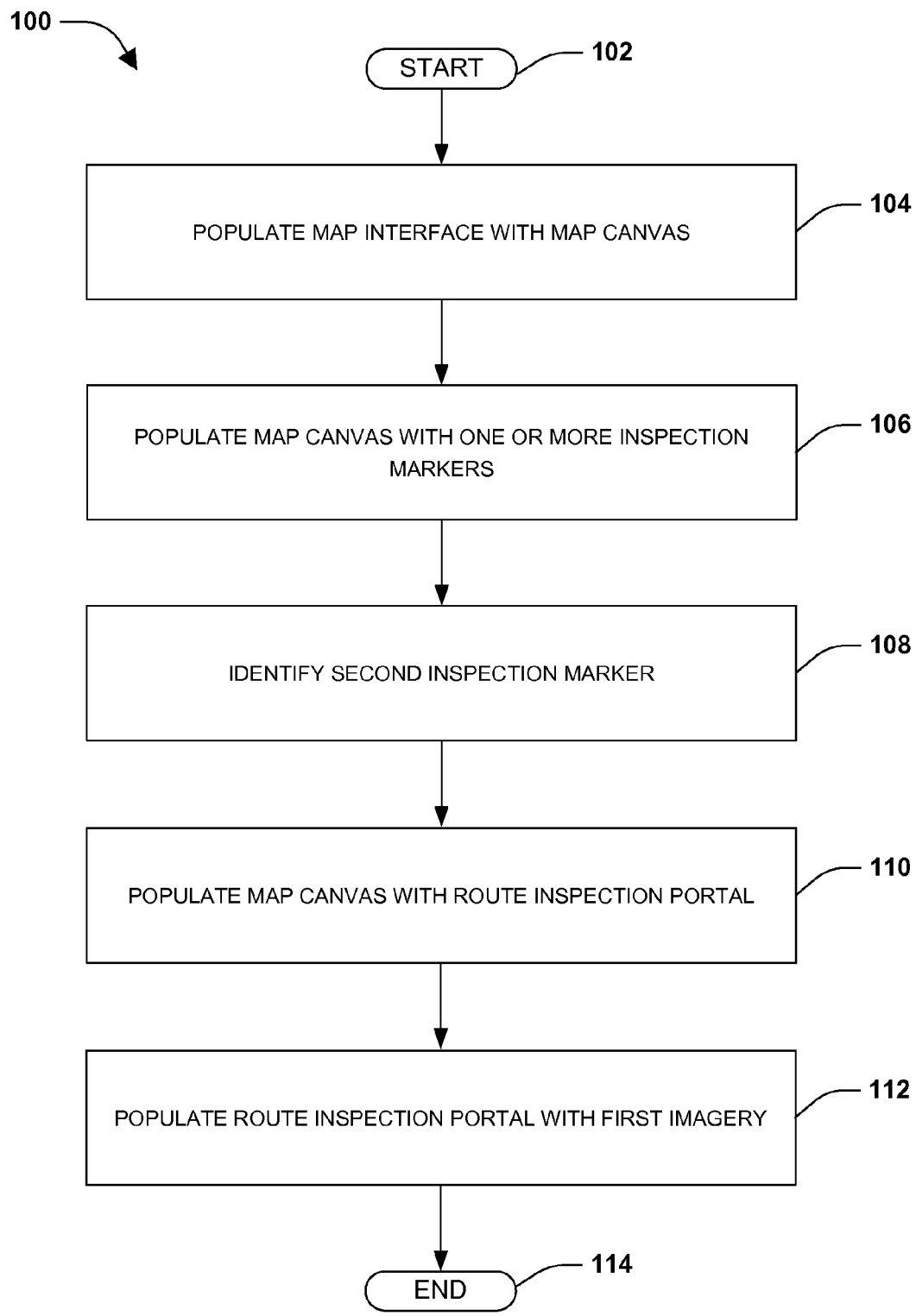
FIG. 1 is a flow diagram illustrating an exemplary method of populating a map interface with a route inspection portal.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for populating a map interface with a route inspection portal and/or for generating a travel route video are provided herein. Users may desire to view relatively higher resolution and/or photorealistic imagery of travel route portions of travel routes depicted by map canvases (e.g., street-side imagery of an intersection that may aid the user in correctly follow driving directions). However, many computing devices, such as mobile devices, may lack processing power, storage, and/or bandwidth to generate, store, and/or construct map canvases with such imagery. Accordingly, a route inspection portal (e.g., a user interface element) is constructed for a travel route portion of a travel route, and imagery of the travel route portion may be populated within the route inspection portal. Because the route inspection portal is populated with imagery of a specified travel route portion at any given time as opposed to imagery of the entire travel route, the route inspection portal may reduce processor utilization, storage, and/or bandwidth. In an example, a mapping component, configured to generate route inspection portals, may be locally hosted on a client device through which a route inspection portal may be displayed, and thus may mitigate bandwidth utilization. In another example, the mapping component may be hosted on a remote server configured to provide route inspection portals to the client device, and thus may mitigate client side memory and/or processor utilization. In an example, the mapping component may be distributed locally and remotely such that some of the mapping component is hosted locally and some of the mapping component is hosted remotely.

An embodiment of populating a map interface with a route inspection portal is illustrated by an exemplary method 100 of FIG. 1. At 102, the method starts. At 104, a map interface may be populated with a map canvas illustrating a travel route. In an example, a user may request driving directions from a home location to a movie theatre location. In another example, user signals associated with the user (e.g., a social network post about seeing a movie, an email, a calendar entry, browsing history, and/or other signals indicative of the user having a user intent to travel to the movie theatre location) may be evaluated (e.g., given user consent) to identify a user intent to travel the travel route. The user may take affirmative action, such as providing opt-in consent, to allow access to and/or use of the user signals, such as for the purpose of travel intent identification (e.g., where a user responds to a prompt regarding the collection and/or use of such information).

At 106, the map canvas may be populated with one or more inspection markers corresponding to imagery depicting travel route portions of the travel route. In an example, an inspection marker may corresponding to imagery (e.g., a photo, street-side imagery, photorealistic imagery, a panorama, rendered imagery, etc.) depicting driving along the travel route from the home location to the movie theatre location (e.g., an on ramp, an off ramp, an intersection, etc.). In another example, an inspection marker may correspond to other areas within the map canvas that are not directly along the travel route, which may be useful if the user becomes lost and may desire to see imagery of other areas not directly along the travel route. In an example, the imagery may be retrieved from a remote source, such as a mapping service, for storage on a client device hosting the map interface (e.g., the user intent to travel the travel route to the movie theatre location may indicate that the user will visit the movie theatre next week, and thus the imagery may be pre-downloaded (e.g., a few days) in advance to the client device while the client device (e.g., a smartphone) is connected to a WiFi network).

At 108, responsive to identifying a selection of a first inspection marker at a first inspection location within the map canvas, a second inspection marker, at a second inspection location, may be identified as corresponding to first imagery depicting the first inspection location. For example, the user may select the first inspection marker located at an intersection along the travel route. The second inspection marker at the second inspection location may be identified as having first imagery depicting (e.g., looking towards) the intersection based upon the second inspection marker being a threshold distance along the travel route before the first inspection marker (e.g., 100 meters before the intersection). That is, the first inspection marker may be associated with imagery looking out from the intersection, and thus such imagery may depict an area looking out from or away from the intersection (e.g., as opposed to imagery depicting the intersection), which may be less unhelpful in aiding the user in navigating the intersection. Accordingly, the second inspection marker, associated with first imagery looking towards the intersection, may be identified (e.g., based upon a distance calculation and/or a direction calculation that identifies the second inspection location as being a threshold distance before the first inspection location of interest to the user).

At 110, the map canvas may be populated with a route inspection portal (e.g., a user interface element, a lens, a bubble, etc.) for the first inspection marker. It may be appreciated that the route inspection portal may comprise any shape (e.g., a circular shape, oval shape, irregular shape), size (e.g., a size that encompasses the first inspection location such as the intersection), color (e.g., a translucent edge), and/or configuration (e.g., the route inspection portal may comprise a user interface element that overlays the map canvas and that allows the route inspection portal to be resizeable and/or moveable by a user).

At 112, the route inspection portal may be populated with the first imagery. The first imagery (e.g., taken from a view perspective of the second inspection location looking towards the intersection at the first inspection location) may comprise photos, street-side imagery, photorealistic imagery, or other imagery depicting the intersection. In an example, a travel instruction associated with the first inspection location may be identified. The travel instruction may comprise an on ramp instruction, an off ramp instruction, a turn instruction, a merge instruction, a yield instruction, a traffic light instruction, an accident alert instruction, a business suggestion instruction, a driving direction instruction, or any other information (e.g., a visual symbol such as a turn symbol, a merge symbol, a stop symbol; a speed limit; a textual instruction such as "turn right"; etc.). In an example, the route inspection portal may be populated with the travel instruction. In another example, a view perspective of the first imagery may be oriented to depict a travel entity corresponding to the travel instruction (e.g., the view perspective may be oriented towards an on ramp onto which the user is to enter from the intersection; the view perspective may be oriented towards an ice cream store, located at the intersection, as a business suggestion to get ice cream before the movie; etc.).

In an example, the route inspection portal may be projected onto a surface. For example, the route inspection portal may be projected onto a wearable device surface (e.g., projected onto a surface of glasses). The route inspection portal may be projected onto a vehicle surface, such as a windshield. In this way, the route inspection portal may be provided through the map canvas (e.g., overlaid the map canvas; anchored to the first inspection location; etc.) or projected onto another surface. In an example, a view perspective associated with the route inspection portal may be modified based upon view modification input. For example, the user may pan, tilt, and/or zoom the view perspective of the route inspection portal (e.g., the user may pan/look left towards a building). In an example, a route inspection interface may be provided to the user. For example, a view transition command associated with the route inspection interface may be received (e.g., the user may select a full view button populated within the map interface). Accordingly, the map interface may be transitioned from displaying the map canvas to displaying the route inspection interface (e.g., a full screen view of the first imagery).

In an example, the user may transition between inspection locations to view route inspection portals depicting various imagery associated with the travel route. For example, responsive to identifying a second selection of a third inspection marker at a third inspection location within the map canvas (e.g., the user may select an off ramp portion of the travel route), a fourth inspection marker, at a fourth inspection location, may be identified as corresponding to second imagery depicting the third inspection location (e.g., a highway section that is before the off ramp, and thus the second imagery taken from the view point of the highway section may depict the off ramp). The map canvas may be populated with a second route inspection portal for the third inspection marker. The second route inspection portal may be populated with the second imagery.

In an example, a travel route video may be generated. The travel route video may comprise a plurality of video frames corresponding to a sequential travel route ordering of the imagery (e.g., imagery starting from the home location as starting video frames to imagery ended at the movie theatre location as ending video frames). Responsive to receiving a play travel route video command, the travel route video may be played. At 114, the method ends.

Figure 2A:
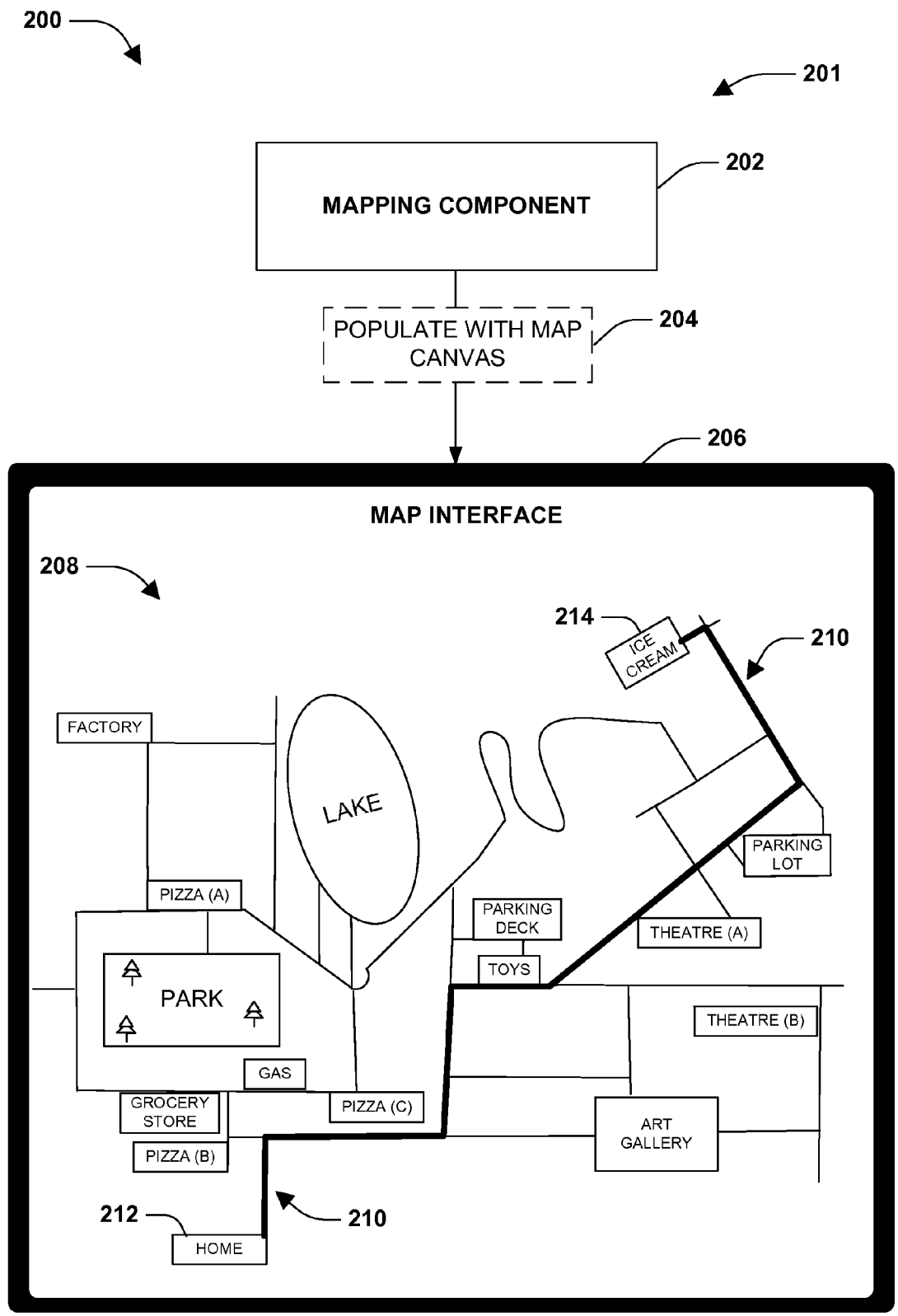
FIG. 2A is a component block diagram illustrating an exemplary system for populating a map interface with a route inspection portal, where a map interface is populated with a map canvas.

FIGS. 2A-2H illustrate examples of a system 201, comprising a mapping component 202 (e.g., hosted on a client device configured to display a map interface 206 or hosted on a remote server configured to provide map canvases to the client device), for populating the map interface 206 with a route inspection portal and/or for generating a travel route video. FIG. 2A illustrates an example 200 of the mapping component 202 populating 204 the map interface 206 with a map canvas 208. For example, the map canvas 208 may illustrate a travel route 210 from a home location 212 to an ice cream location 214.

Figure 2B:
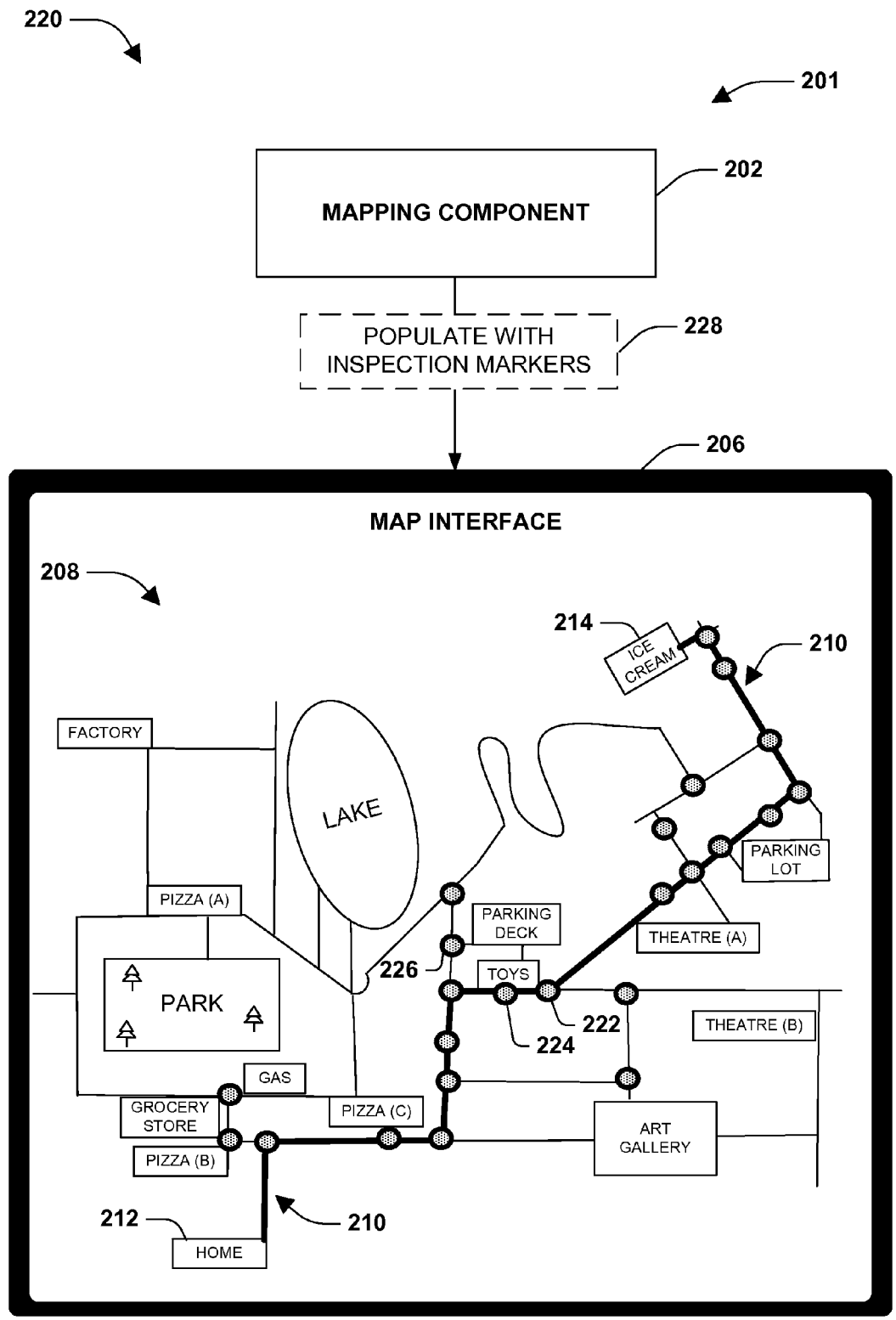
FIG. 2B is a component block diagram illustrating an exemplary system for populating a map interface with a route inspection portal, where a map canvas is populated with one or more inspection markers.

FIG. 2B illustrates an example 220 of the mapping component 202 populating 228 the map canvas 208 with one or more inspection markers corresponding to inspection locations associated with the travel route 210. For example, a first inspection marker 222 may be located at a first inspection location (e.g., near an onramp to a highway) and a second inspection marker 224 may be located at a second inspection location (e.g., a street just before the onramp).

Figure 2C:
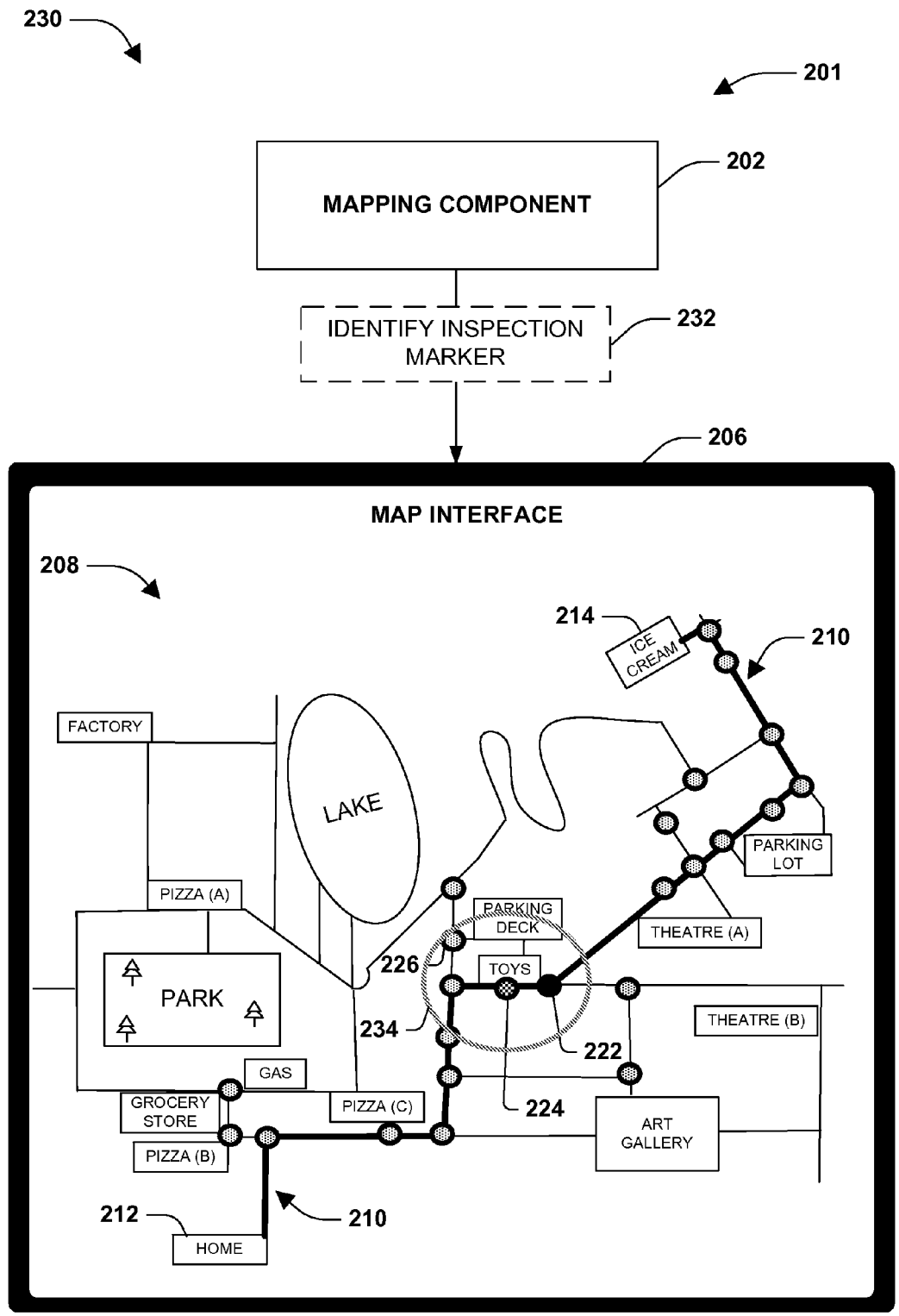
FIG. 2C is a component block diagram illustrating an exemplary system for populating a map interface with a route inspection portal, where an inspection marker is identified.

FIG. 2C illustrates an example 230 of the mapping component 202 identifying 232 an inspection marker corresponding to imagery depicting an inspection location of a selected inspection marker. For example, a user may select the first inspection marker 222 at the first inspection location because the user may desire to view imagery of the onramp. The second inspection marker 224 may be identified 232 as corresponding to first imagery depicting the first inspection location of the onramp (e.g., based upon the second inspection marker 224 being a threshold distance before the first inspection location). Accordingly, the mapping component 202 may populate the map canvas 208 with a route inspection portal 234 (e.g., at a location within the map canvas 208 that may overlay the first inspection location and/or second inspection location).

Figure 2D:
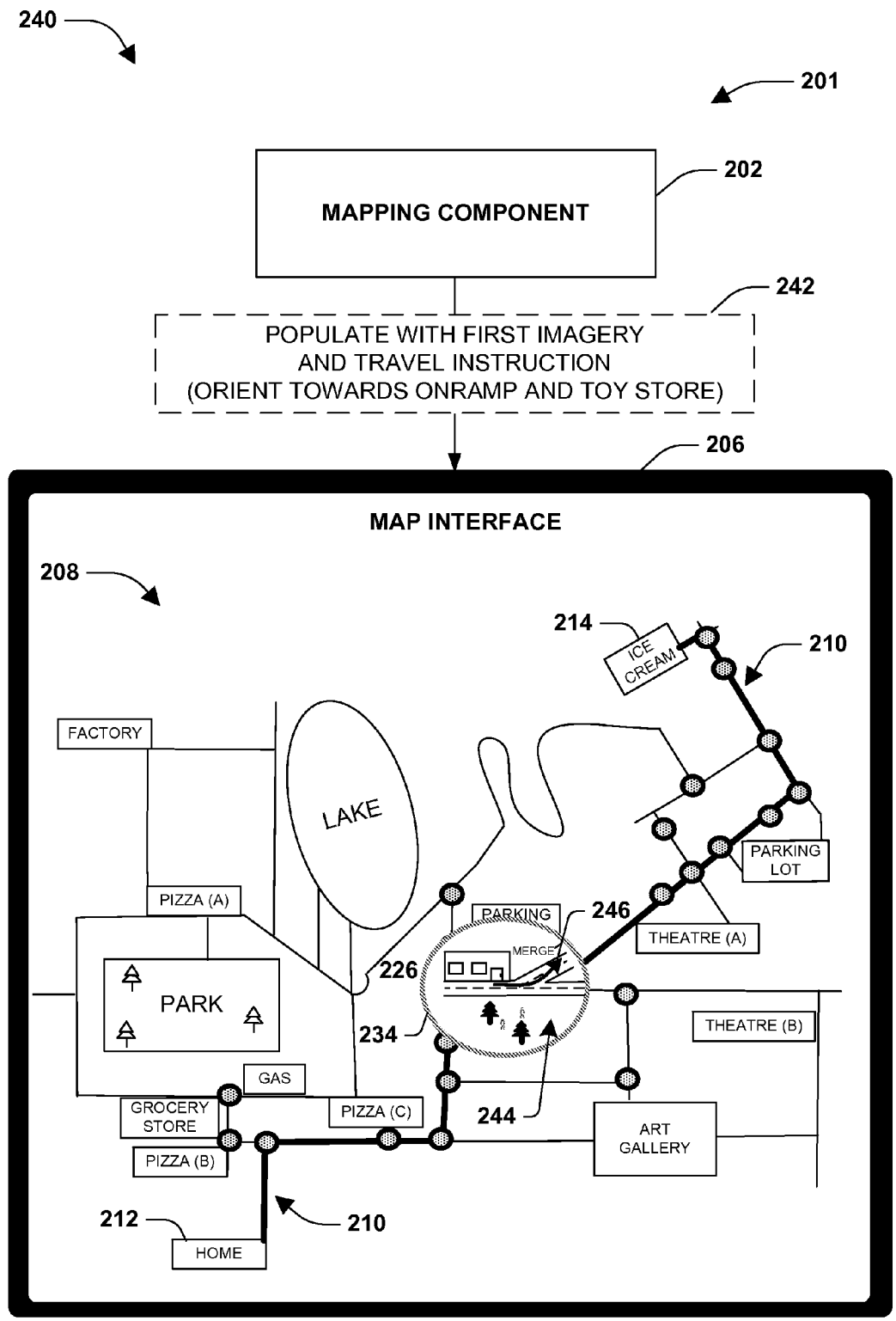
FIG. 2D is a component block diagram illustrating an exemplary system for populating a map interface with a route inspection portal, where a route inspection portal is populated with first imagery and a travel instruction.

FIG. 2D illustrates an example 240 of the mapping component 202 populating 242 the route inspection portal 234 with first imagery 244 and/or a travel instruction 246 that may have a view perspective that is oriented based upon the onramp and/or a toy store). For example, the first imagery 244 may have been taken from a view point of the second inspection location associated with the second inspection marker 224, and thus the first imagery 244 may depict (e.g., look towards) the first inspection location such as the onramp near the toy store. In an example, a view perspective of the first imagery 244 may be oriented towards the onramp (e.g., to aid the user in visually navigating a driving instruction to enter the onramp) and/or the toy store (e.g., for promotional/advertising purposes; user signals may indicate that the user is traveling to a birthday party at the ice cream location 214, and thus the toy store may be provided as a business suggestion where the user may purchase a birthday present for the birthday party; etc.). In an example, the route inspection portal 234 may be populated with the travel instruction 246, such as an arrow symbol indicating that the user is to enter the onramp.

Figure 2E:
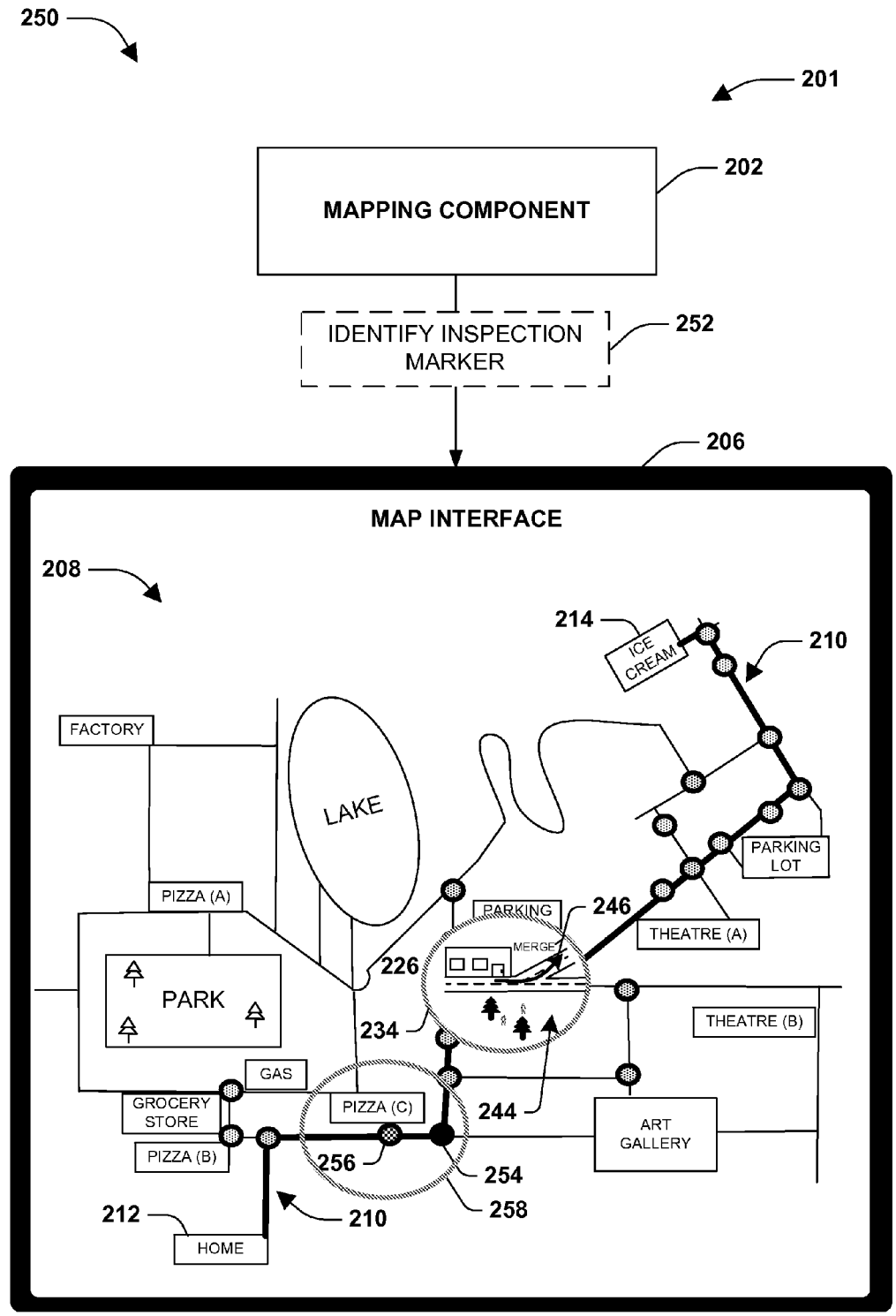
FIG. 2E is a component block diagram illustrating an exemplary system for populating a map interface with a route inspection portal, where an inspection marker is identified.

FIG. 2E illustrates an example 250 of the mapping component 202 identifying 252 an inspection marker corresponding to imagery depicting an inspection location of a selected inspection marker. For example, the user may select a third inspection marker 254 at a third inspection location because the user may desire to view imagery at a pizza shop intersection. A fourth inspection marker 256 may be identified 252 as corresponding to second imagery depicting the third inspection location of the pizza shop intersection (e.g., based upon the fourth inspection marker 256 being a threshold distance before the third inspection location). Accordingly, the mapping component 202 may populate the map canvas 208 with a second route inspection portal 258 (e.g., at a location within the map canvas 208 that may overlay the third inspection location and/or fourth inspection location).

Figure 2F:
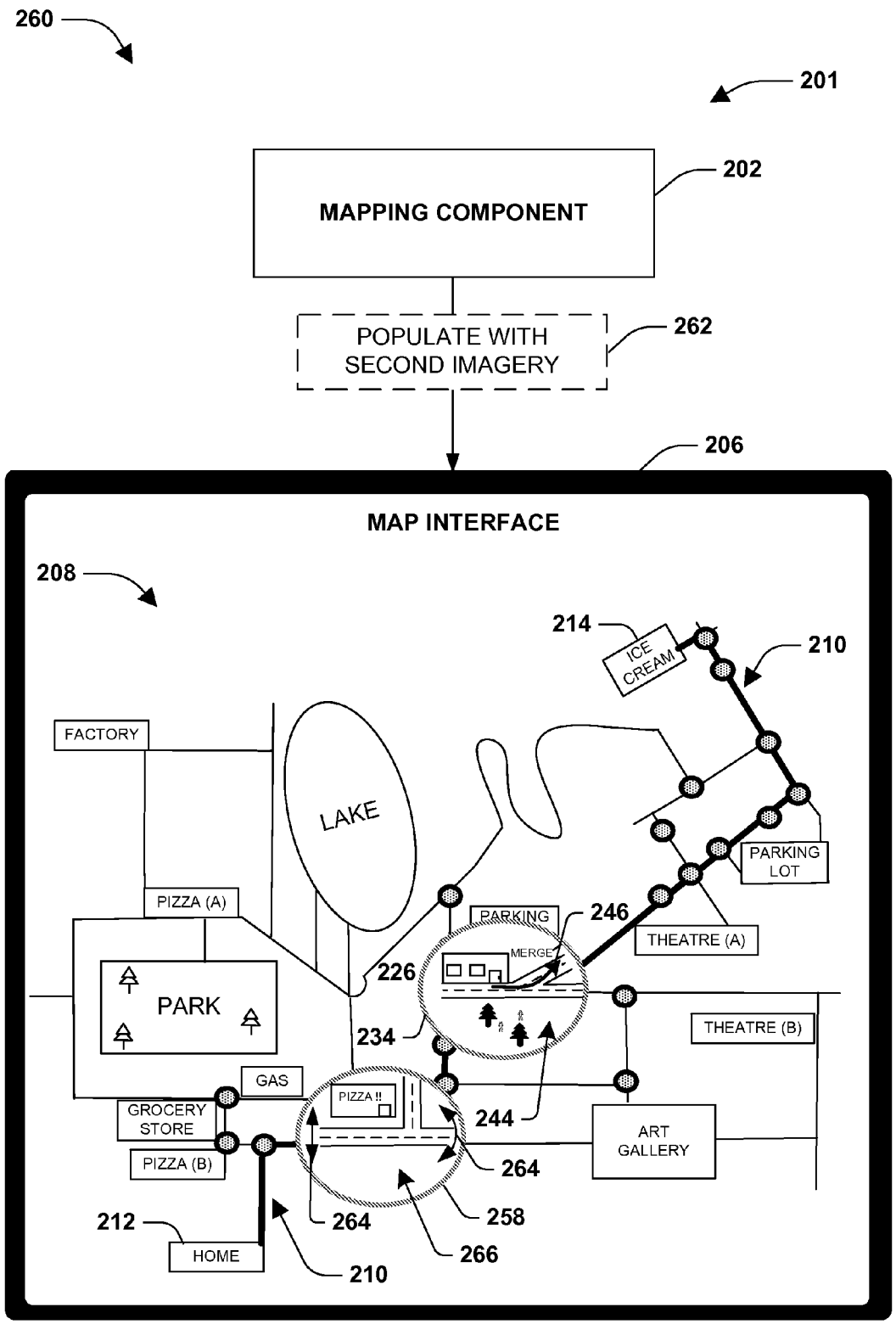
FIG. 2F is a component block diagram illustrating an exemplary system for populating a map interface with a route inspection portal, where a second route inspection portal is populated with second imagery.

FIG. 2F illustrates an example 260 of the mapping component 202 populating 262 the second route inspection portal 258 with the second imagery 266. For example, the second imagery 266 may have been taken from a view point of the fourth inspection location associated with the fourth inspection marker 256, and thus the second imagery 266 may depict (e.g., look towards) the third inspection location such as the pizza shop intersection. In an example, a view perspective of the second imagery 266 may be oriented towards a pizza shop (e.g., as a business suggestion based upon user signals, such as a social network message, indicating that the user is going to grab pizza before going to an ice cream birthday party). In an example, the second route inspection portal 258 may be populated with view modification elements 264. The user may invoke the view modification elements 264 to pan, tilt, zoom, or otherwise modify the view perspective of the second route inspection portal 258.

Figure 2G:
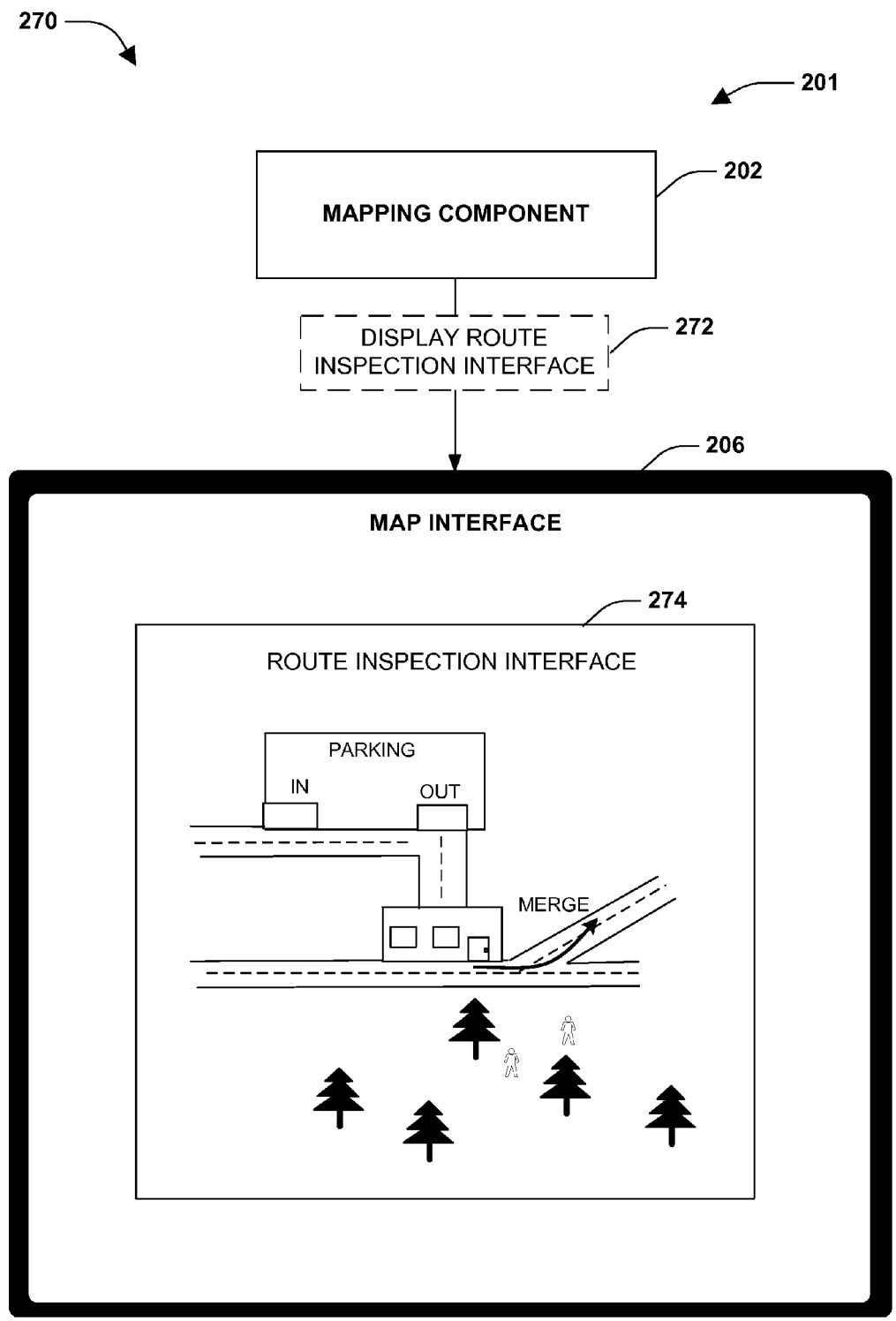
FIG. 2G is a component block diagram illustrating an exemplary system for populating a map interface with a route inspection portal, where a route inspection interface is displayed.

FIG. 2G illustrates an example 270 of the mapping component 202 displaying 272 a route inspection interface 274. For example, the mapping component 202 may receive a view transition command (e.g., a selection of a view transition button such as a "full screen view" button; a selection of the route inspection portal 234 (e.g., illustrated in FIG. 2F) such as a touch gesture or mouse click; etc.). Accordingly, the mapping component 202 may transition the map interface 206 from displaying the map canvas 208 (e.g., illustrated in FIG. 2F) to displaying the route inspection interface 274. The route inspection interface 274 may be derived from the route inspection portal 234 (e.g., the route inspection interface 274 may provide a zoomed in or full screen view of the first imagery 244 that was populated within the route inspection portal 234).

Figure 2H:
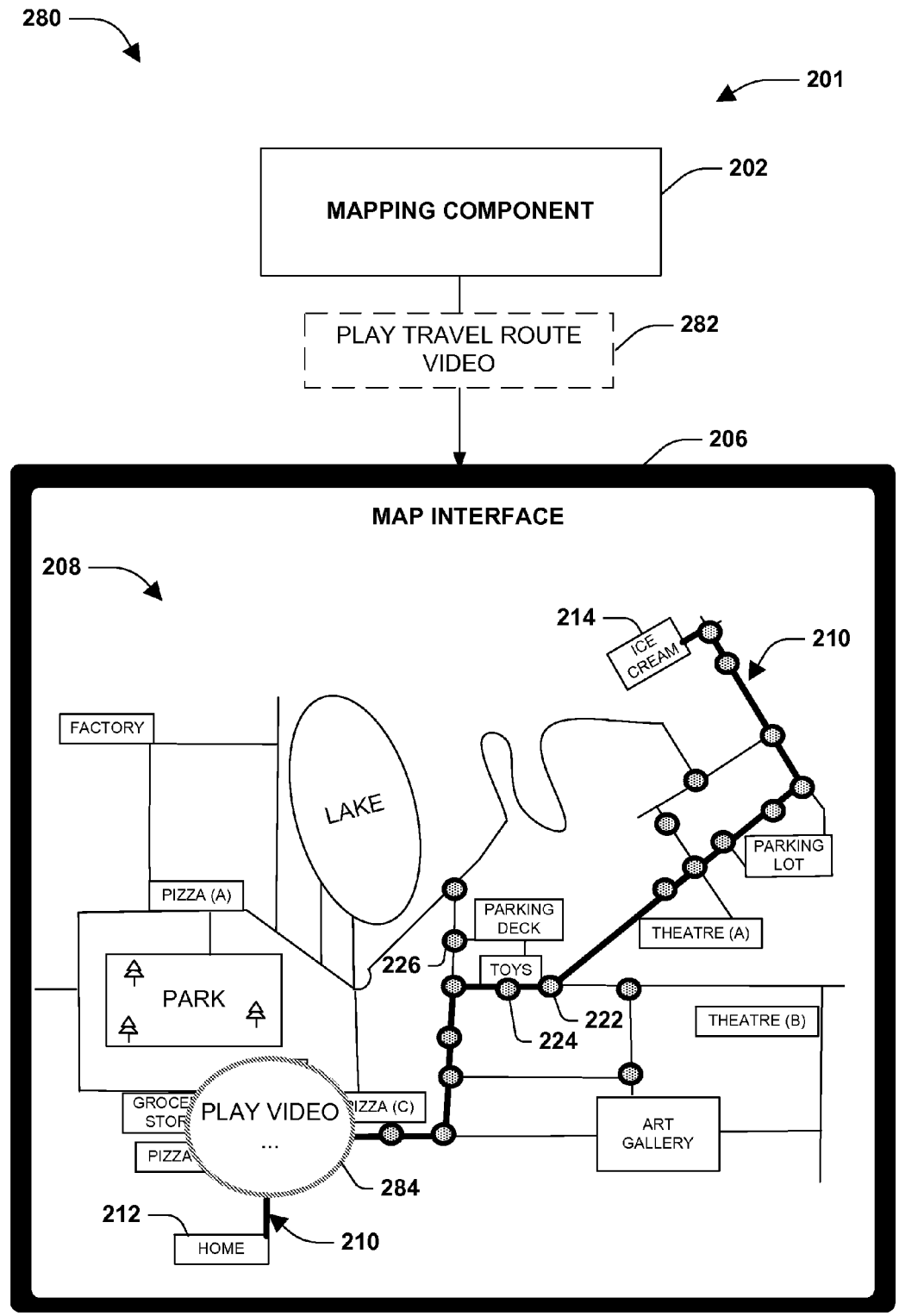
FIG. 2H is a component block diagram illustrating an exemplary system for populating a map interface with a route inspection portal, where a travel route video is generated and played.

FIG. 2H illustrates an example 280 of playing 282 a travel route video 284. For example, the mapping component 202 may generate the travel route video 284 by creating a plurality of video frames that correspond to a sequential travel route ordering (e.g., an ordering from the home location 212 as a starting video frame to the ice cream location 214 as an ending video frame) of imagery depicting travel route portions of the travel route 210. The travel route video 284 may be populated within the map interface 206, such as at a location or inspection marker that is relatively close to the home location 212. Responsive to receiving a play travel route video command, the travel route video 284 may be played. For example, during play of the travel route video 284, a current position of the travel route video 284 may be positioned at a location within the map canvas 208 that corresponds to a location of imagery of a current video frame being displayed (e.g., while displaying video frames of imagery near the home location 212, the travel route video 284 may be positioned near the home location 212; while displaying video frames of imagery near the first inspection marker 222, the travel route video 284 may be positioned near the first inspection marker 222; etc.). In this way, the user may watch the travel route 210 being traveled based upon video frames, of the travel route video 284, being populated with imagery of travel route portions of the travel route 210.

Figure 3:
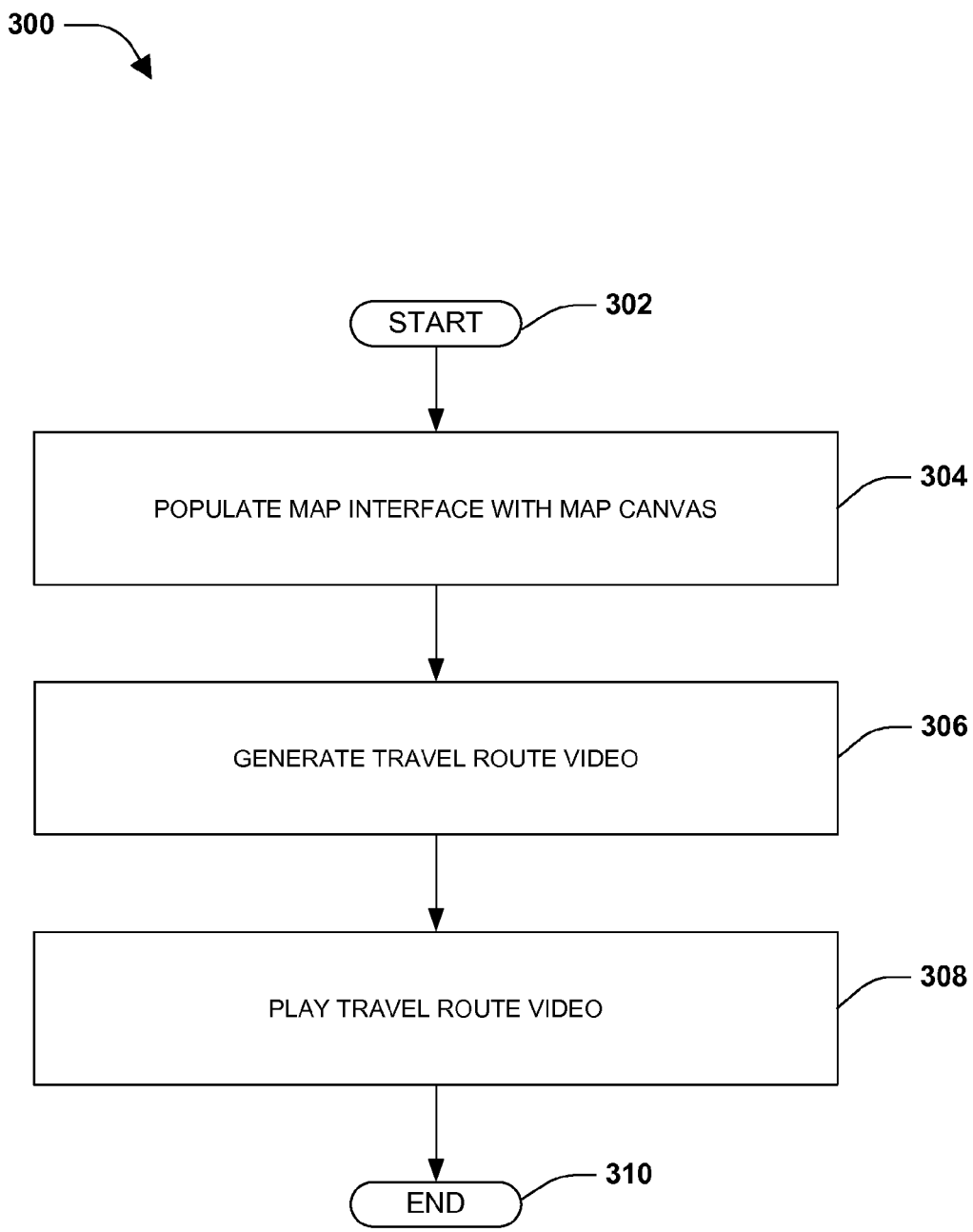
FIG. 3 is a flow diagram illustrating an exemplary method of generating a travel route video.

An embodiment of generating a travel route video is illustrated by an exemplary method 300 of FIG. 3. At 302, the method starts. At 304, a map interface may be populated with a map canvas illustrating a travel route. At 306, a travel route video, comprising a plurality of video frames corresponding to a sequential travel route ordering of imagery depicting travel route portions of the travel route, may be generated. At 308, responsive to receiving a play travel route video command, the travel route video may be played. For example, the travel route video may be played through the map interface (e.g., overlaid the map canvas). The travel route video may be positioned at locations within the map canvas that correspond to locations of imagery currently depicted by video frames of the travel route video. At 310, the method ends.

According to an aspect of the instant disclosure, a method for populating a map interface with a route inspection view portal is provided. The method includes populating a map interface with a map canvas illustrating a travel route. The map canvas may be populated with one or more inspection markers corresponding to imagery depicting travel route portions of the travel route. Responsive to identifying a selection of a first inspection marker at a first inspection location within the map canvas, a second inspection marker, at a second inspection location, may be identified as corresponding to first imagery depicting the first inspection location. The map canvas may be populated with a route inspection portal for the first inspection marker. The route inspection portal may be populated with the first imagery.

According to an aspect of the instant disclosure, a system for populating a map interface with a route inspection portal is provided. The system includes a mapping component. The mapping component may be configured to populate a map interface with a map canvas illustrating a travel route. The mapping component may be configured to populate the map canvas with one or more inspection markers corresponding to imagery depicting travel route portions of the travel route. Responsive to identifying a selection of a first inspection marker at a first inspection location within the map canvas, the mapping component may be configured to identify a second inspection marker, at a second inspection location, as corresponding to first imagery depicting the first inspection location. The mapping component may be configured to populate the map canvas with a route inspection portal for the first inspection marker. The mapping component may be configured to identify a travel instruction for the first inspection location. The mapping component may be configured to populate the route inspection portal with the first imagery and the travel instruction.

According to an aspect of the instant disclosure, a method for generating a travel route video is provided. The method includes populating a map interface with a map canvas illustrating a travel route. A travel route video, comprising a plurality of video frames corresponding to a sequential travel route ordering of imagery depicting travel route portions of the travel route, may be generated. Responsive to receiving a play travel route video command, the travel route video may be played.

According to an aspect of the instant disclosure, a means for populating a map interface with a route inspection view portal is provided. The means for populating may populate a map interface with a map canvas illustrating a travel route. The means for populating may populate the map canvas with one or more inspection markers corresponding to imagery depicting travel route portions of the travel route. Responsive to identifying a selection of a first inspection marker at a first inspection location within the map canvas, the means for populating may identify a second inspection marker, at a second inspection location, as corresponding to first imagery depicting the first inspection location. The means for populating may populate the map canvas with a route inspection portal for the first inspection marker. The means for populating may populate the route inspection portal with the first imagery. The means for populating may identify a travel instruction for the first inspection location may. The means for populating may populate the route inspection portal with the travel instruction.

According to an aspect of the instant disclosure, a means for generating a travel route video is provided. The means for generating may populate a map interface with a map canvas illustrating a travel route. The means for generating may generate a travel route video, comprising a plurality of video frames corresponding to a sequential travel route ordering of imagery depicting travel route portions of the travel route. Responsive to receiving a play travel route video command, the means for generating may play the travel route video.

Figure 4:
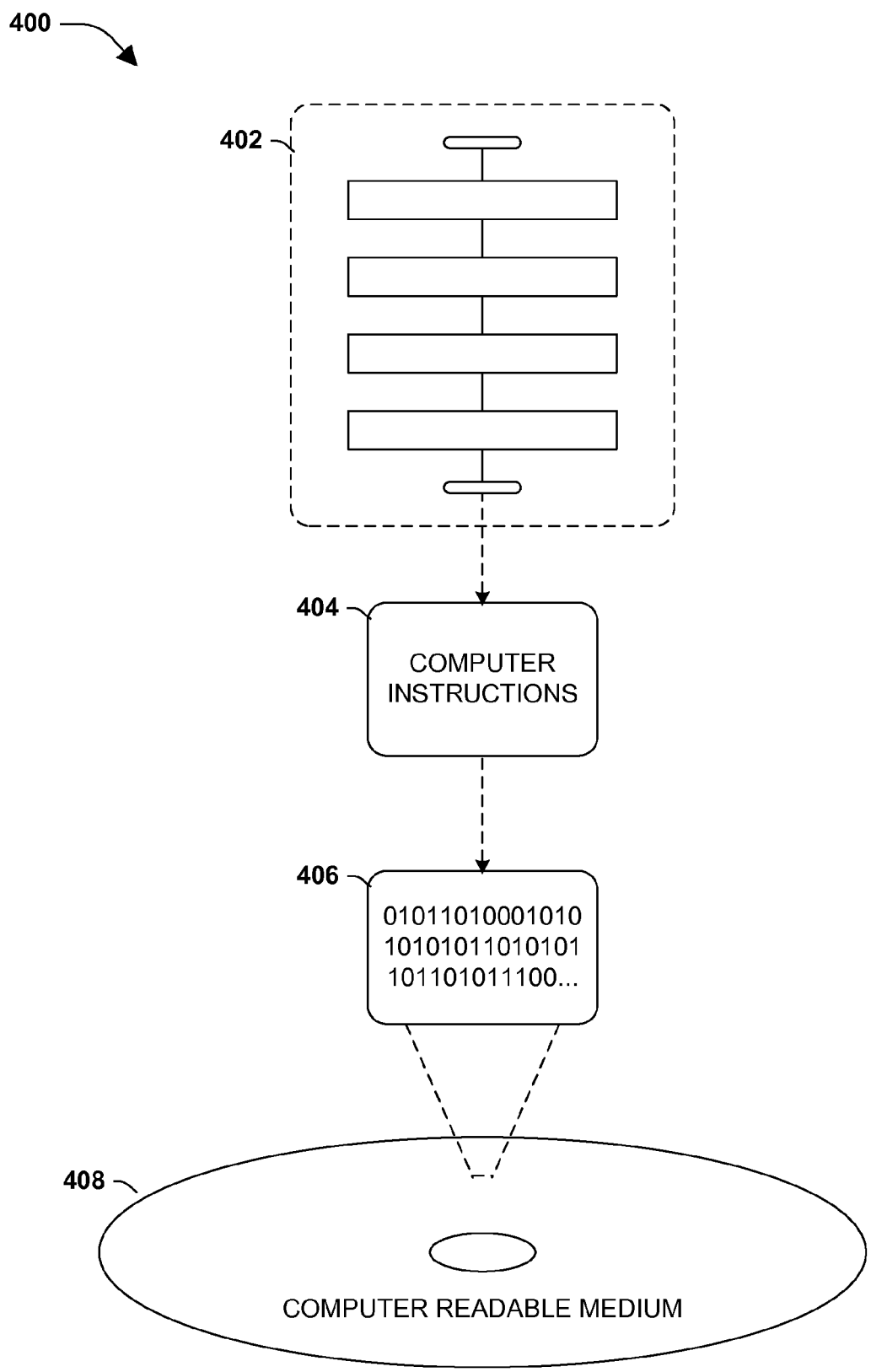
FIG. 4 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 4, wherein the implementation 400 comprises a computer-readable medium 408, such as a CD-R, DVD-R, flash drive, a platter of a hard disk drive, etc., on which is encoded computer-readable data 406. This computer-readable data 406, such as binary data comprising at least one of a zero or a one, in turn comprises a set of computer instructions 404 configured to operate according to one or more of the principles set forth herein. In some embodiments, the processor-executable computer instructions 404 are configured to perform a method 402, such as at least some of the exemplary method 100 of FIG. 1 and/or at least some of the exemplary method 300 of FIG. 3, for example. In some embodiments, the processor-executable instructions 404 are configured to implement a system, such as at least some of the exemplary system 201 of FIGS. 2A-2H, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
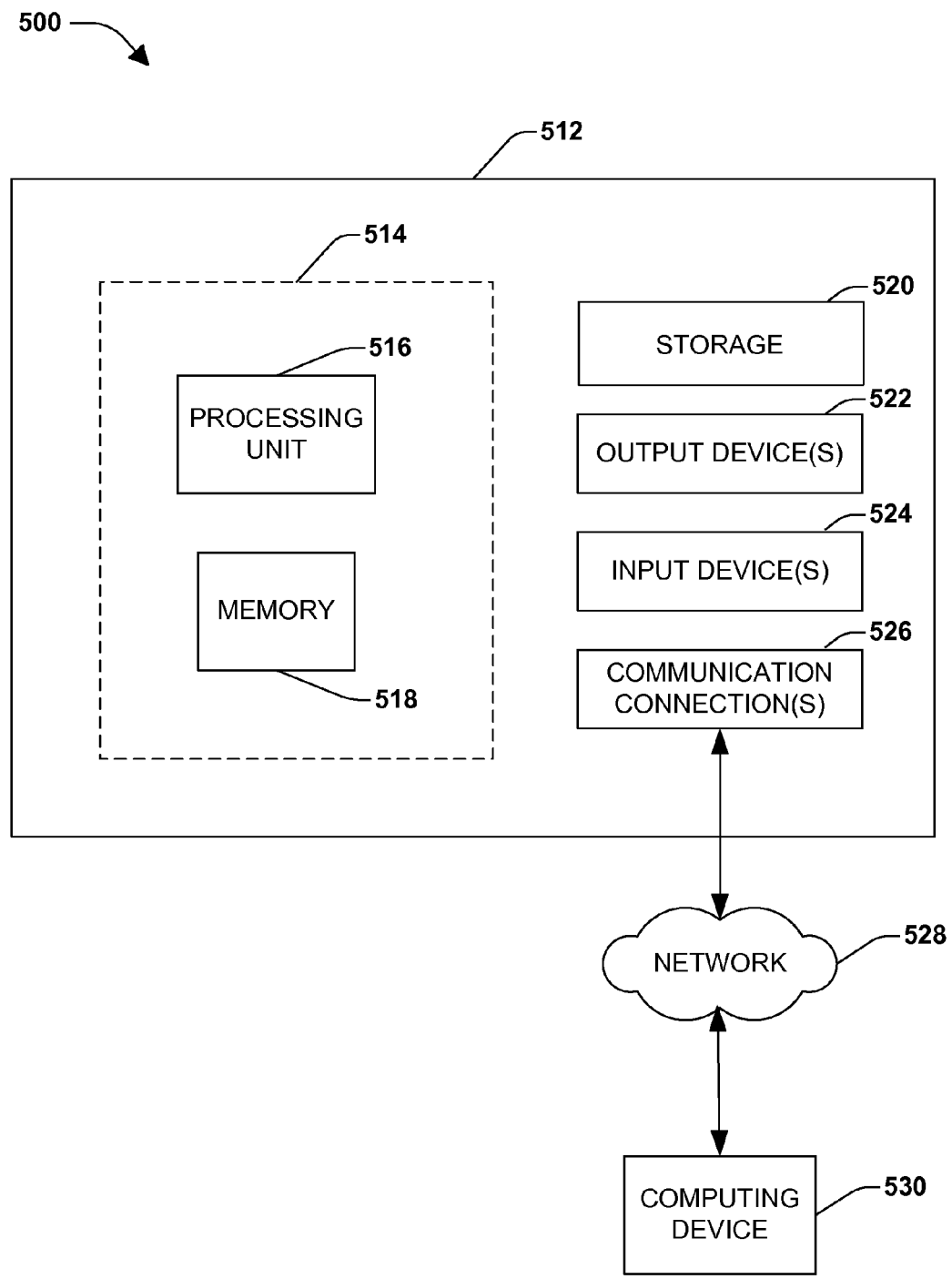
FIG. 5 illustrates an exemplary computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 illustrates an example of a system 500 comprising a computing device 512 configured to implement one or more embodiments provided herein. In one configuration, computing device 512 includes at least one processing unit 516 and memory 518. Depending on the exact configuration and type of computing device, memory 518 may be volatile (such as RAM, for example), non-volatile (such as ROM, flash memory, etc., for example) or some combination of the two. This configuration is illustrated in FIG. 5 by dashed line 514.

In other embodiments, device 512 may include additional features and/or functionality. For example, device 512 may also include additional storage (e.g., removable and/or non-removable) including, but not limited to, magnetic storage, optical storage, and the like. Such additional storage is illustrated in FIG. 5 by storage 520. In one embodiment, computer readable instructions to implement one or more embodiments provided herein may be in storage 520. Storage 520 may also store other computer readable instructions to implement an operating system, an application program, and the like. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 512. Computer storage media does not, however, include propagated signals. Rather, computer storage media excludes propagated signals. Any such computer storage media may be part of device 512.

Device 512 may also include communication connection(s) 526 that allows device 512 to communicate with other devices. Communication connection(s) 526 may include, but is not limited to, a modem, a Network Interface Card (NIC), an integrated network interface, a radio frequency transmitter/receiver, an infrared port, a USB connection, or other interfaces for connecting computing device 512 to other computing devices. Communication connection(s) 526 may include a wired connection or a wireless connection. Communication connection(s) 526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 512 may include input device(s) 524 such as keyboard, mouse, pen, voice input device, touch input device, infrared cameras, video input devices, and/or any other input device. Output device(s) 522 such as one or more displays, speakers, printers, and/or any other output device may also be included in device 512. Input device(s) 524 and output device(s) 522 may be connected to device 512 via a wired connection, wireless connection, or any combination thereof. In one embodiment, an input device or an output device from another computing device may be used as input device(s) 524 or output device(s) 522 for computing device 512.

Components of computing device 512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 512 may be interconnected by a network. For example, memory 518 may be comprised of multiple physical memory units located in different physical locations interconnected by a network.

Those skilled in the art will realize that storage devices utilized to store computer readable instructions may be distributed across a network. For example, a computing device 530 accessible via a network 528 may store computer readable instructions to implement one or more embodiments provided herein. Computing device 512 may access computing device 530 and download a part or all of the computer readable instructions for execution. Alternatively, computing device 512 may download pieces of the computer readable instructions, as needed, or some instructions may be executed at computing device 512 and some at computing device 530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for reducing processor, storage or bandwidth utilization through the presentation of a map interface, the method comprising:
   physically generating, on a physical display device communicationally coupled to a computing device, a first map interface comprising:
     a map canvas;
     a travel route visually illustrated on the map canvas; and
     multiple inspection markers visually illustrated on the map canvas proximate to the travel route, wherein each of the multiple inspection markers correspond to physical locations from which imagery that depicts other physical locations, that are geographically located along the travel route, was obtained;
   receiving, at the computing device, a user input selecting first inspection marker, from among the multiple inspection markers;
   identifying, by the computing device, in response to the user input, a second inspection marker differing from the first inspection marker, the second inspection marker corresponding to a second physical location from which a first imagery, that depicts a first physical location represented by the first inspection marker, was obtained; and
   physically generating, on the physical display device, a second map interface representing an update to the first map interface in response to the user input, the second map interface comprising:
     the map canvas;
     the travel route;
     a route inspection portal visually overlaid over a portion of the map canvas such that the portion of the map canvas that is visually overlaid by the route inspection portal is, visually, wholly surrounded by the map canvas; and
     the first imagery, obtained from the second physical location to which the second inspection marker corresponds, depicting the first physical location represented by the first inspection marker, the first imagery being, visually displayed, on the physical display device, wholly within the route inspection portal.

2. The method of claim 1, further comprising: physically generating, on the physical display device, a third map interface, representing an update to the second map interface, the third map interface comprising:
   the map canvas;
   the travel route;
   the route inspection portal; and
   a travel route video displayed, visually, wholly within the route inspection portal, the travel route video corresponding to a sequential ordering of the displayable imagery from the portions of the travel route to which the multiple inspection markers correspond.

3. The method of claim 1, wherein the first imagery is a 360 degree street-side imagery that comprises a depiction of the first physical location.

4. The method of claim 1, further comprising:
   receiving, at the computing device, a second user input selecting a view modification; and
   physically generating, on the physical display device, a third map interface representing an update to the second map interface in response to the second user input, the third map interface comprising:
     the map canvas;
     the travel route;

the route inspection portal; and a second imagery, which was also obtained from the second physical location, the second imagery comprising a modified view perspective as compared with the first imagery previously displayed within the route inspection portal, wherein the second imagery is also, visually displayed, on the physical display device, wholly within the route inspection portal.

5. The method of claim 1, wherein the first imagery depicts a view of the first physical location as would be seen by an entity driving along the travel route in a direction of travel indicated by the travel route.

6. The method of claim 1, further comprising: physically generating, on a projection physical display device communicationally coupled to the computing device, the route inspection portal and the first imagery to which the second inspection marker corresponds, such that they are visually projected onto a surface.

7. The method of claim 6, wherein the surface is a vehicle windshield.

8. The method of claim 1, wherein the first imagery is a video clip that comprises a depiction of the first physical location.

9. The method of claim 1, wherein the first imagery is a photorealistic image that comprises a depiction of the first physical location.

10. A computing device comprising:
one or more processing units;
a display device; and
one or more computer storage media comprising computer-executable instructions which, when executed by the one or more processing units, cause the computing device to:
generate, on the display device, a first map interface comprising:
a map canvas;
a travel route visually illustrated on the map canvas; and
multiple inspection markers visually illustrated on the map canvas proximate to the travel route, wherein each of the multiple inspection markers correspond to physical locations from which imagery that depicts other physical locations, that are geographically located along the travel route, was obtained;
receive a user input selecting first inspection marker, from among the multiple inspection markers;
identify, in response to the user input, a second inspection marker differing from the first inspection marker, the second inspection marker corresponding to a second physical location from which a first imagery, that depicts a first physical location represented by the first inspection marker, was obtained; and
generate, on the display device, a second map interface representing an update to the first map interface in response to the user input, the second map interface comprising:
the map canvas;
the travel route;
a route inspection portal visually overlaid over a portion of the map canvas such that the portion of the map canvas that is visually overlaid by the route inspection portal is, visually, wholly surrounded by the map canvas; and
the first imagery, obtained from the second physical location to which the second inspection marker corresponds, depicting the first physical location represented by the first inspection marker, the first imagery being, visually displayed, on the physical display device, wholly within the route inspection portal.

11. The computing device of claim 10, wherein the one or more computer storage media comprising further computer-executable instructions which, when executed by the one or more processing units, cause the computing device to:
generate, on the display device, a third map interface, representing an update to the second map interface, the third map interface comprising:
the map canvas;
the travel route;
the route inspection portal; and
a travel route video displayed, visually, wholly within the route inspection portal, the travel route video corresponding to a sequential ordering of the displayable imagery from the portions of the travel route to which the multiple inspection markers correspond.

12. The computing device of claim 10, wherein the one or more computer storage media comprising further computer-executable instructions which, when executed by the one or more processing units, cause the computing device to:
receive a second user input selecting a view modification; and
generate, on the display device, a third map interface representing an update to the second map interface in response to the second user input, the third map interface comprising:
the map canvas;
the travel route;
the route inspection portal; and
a second imagery, which was also obtained from the second physical location, the second imagery comprising a modified view perspective as compared with the first imagery previously displayed within the route inspection portal, wherein the second imagery is also, visually displayed, on the physical display device, wholly within the route inspection portal.

13. The computing device of claim 10, wherein the first imagery depicts a view of the first physical location as would be seen by an entity driving along the travel route in a direction of travel indicated by the travel route.

14. The computing device of claim 10, further comprising a projection display device; wherein the one or more computer storage media comprising further computer-executable instructions which, when executed by the one or more processing units, cause the computing device to: generate, on the projection display device, the route inspection portal and the first imagery to which the second inspection marker corresponds, such that they are visually projected onto a surface.

15. The computing device of claim 10, wherein the first imagery is a 360 degree street-side imagery that comprises a depiction of the first physical location.

16. The computing device of claim 10, wherein the first imagery is a video clip that comprises a depiction of the first physical location.

17. The computing device of claim 10, wherein the first imagery is a photorealistic image that comprises a depiction of the first physical location.

18. A graphical user interface physically generated on a physical display device communicationally coupled to a computing device, the graphical user interface comprising:
- a map canvas;
- a travel route visually illustrated on the map canvas;
- multiple inspection markers visually illustrated on the map canvas proximate to the travel route, wherein each of the multiple inspection markers correspond to physical locations from which imagery that depicts other physical locations, that are geographically located along the travel route, was obtained;
- a route inspection portal visually overlaid over a portion of the map canvas such that the portion of the map canvas that is visually overlaid by the route inspection portal is, visually, wholly surrounded by the map canvas; and
- a first imagery, obtained from the second physical location to which a second inspection marker corresponds, depicting the first physical location represented by a first inspection marker differing from the second inspection marker, the first imagery being, visually displayed, on the physical display device, wholly within the route inspection portal.

19. The graphical user interface of claim 18, wherein the first imagery is a video clip that comprises a depiction of the first physical location.

20. The graphical user interface of claim 18, wherein the first imagery is a photorealistic image that comprises a depiction of the first physical location.

* * * * *